(12) United States Patent
Tabata

(10) Patent No.: US 8,248,488 B2
(45) Date of Patent: Aug. 21, 2012

(54) DISPLAY DEVICE AND IMAGING APPARATUS USING THE SAME

(75) Inventor: Kazumasa Tabata, Osaka (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 12/644,536

(22) Filed: Dec. 22, 2009

(65) Prior Publication Data

US 2010/0165147 A1    Jul. 1, 2010

(30) Foreign Application Priority Data

Dec. 26, 2008    (JP) ................................. 2008-332550

(51) Int. Cl.
*H04N 5/76* (2006.01)
*H04N 5/222* (2006.01)
*G09G 5/10* (2006.01)

(52) U.S. Cl. ............... 348/231.99; 348/333.01; 345/690

(58) Field of Classification Search .......................... None
See application file for complete search history.

(56) References Cited

U.S. PATENT DOCUMENTS

| | | | |
|---|---|---|---|
| 2001/0043277 A1* | 11/2001 | Tanaka et al. | 348/333.01 |
| 2009/0128583 A1* | 5/2009 | Choi | 345/690 |
| 2009/0147094 A1* | 6/2009 | Chiang | 348/222.1 |
| 2009/0231364 A1* | 9/2009 | Tsai | 345/690 |
| 2010/0039414 A1* | 2/2010 | Bell | 345/207 |

FOREIGN PATENT DOCUMENTS

JP    9-065181 A    3/1997

\* cited by examiner

*Primary Examiner* — Luong T Nguyen
(74) *Attorney, Agent, or Firm* — Hamre, Schumann, Mueller & Larson, P.C.

(57) ABSTRACT

A brightness adjustment section 23 adjusts brightness of the liquid crystal monitor 182 based on a set value determined by an automatic determination section 21*a* or a set value accepted by an operation section 184. A prohibition section 24 prohibits the brightness adjustment section 23 from adjusting the brightness of the liquid crystal monitor 182 based on the set value determined by the automatic determination section 21*a*. During a period from a point when the prohibition section 24 prohibits the brightness adjustment that is based on the set value determined by the automatic determination section 21*a* until the operation section 184 accepts a new operation on the set value, the brightness adjustment section 23 adjusts the brightness of the liquid crystal monitor 182 based on a first set value that is the set value determined by the automatic determination section 21*a* last before the point of prohibition, or a second set value obtained by correcting the first set value.

9 Claims, 6 Drawing Sheets

DISPLAY DEVICE AND IMAGING APPARATUS USING THE SAME

BACKGROUND OF THE INVENTION

1. Field of the Invention

The present invention relates to a display device. Particularly, the present invention relates to a display device having an automatic adjustment mode for adjusting brightness of a screen in accordance with the ambient brightness, and a manual adjustment mode for adjusting brightness of the screen based on a manually-set value. The present invention also relates to an imaging apparatus using the display device.

2. Description of Related Art

Today, many digital video cameras have a liquid crystal display section. A user can check the image being taken on the liquid crystal display section. Moreover, images based on the data recorded on a recording medium can be displayed on the liquid crystal display section. When a back light of the liquid crystal display section has a constant brightness regardless of the ambient brightness, occasionally it is hard to see the images in a bright place outdoors because the brightness of the liquid crystal display section is insufficient, and it is hard to see the images in a dark place indoors because the liquid crystal display section is too bright.

JP 9 (1997)-65181 A discloses a technique for adjusting the brightness of a back light in accordance with ambient brightness. In a display section of an imaging apparatus of this invention, luminance signals for one screen are integrated, and the brightness (an Ev value (an exposure value)) of a subject is calculated from the integrated value of the luminance signals, positional information of an iris, etc. The back light is controlled based on the Ev value.

Some display devices have a manual adjustment mode that allows a user to specify the brightness of a screen so that the user can set the screen brightness of his/her preference regardless of the ambient brightness. Some display devices have both of the automatic adjustment mode for adjusting the brightness of the screen in accordance with the ambient brightness, and the manual adjustment mode allowing a user to specify the brightness of the screen.

SUMMARY OF THE INVENTION

Separately from the modes for brightness adjustment, some display devices have an auto mode for adjusting various settings automatically and a manual mode that allows a user to adjust the various settings by his/her operation, as modes provided for the entire display device. When the operation mode is switched from the auto mode to the manual mode in such a display device, the mode for brightness adjustment also is switched forcibly from the automatic adjustment mode to the manual adjustment mode. When the display device was in the automatic adjustment mode before the switching, the brightness of the screen is adjusted to a default value of the manual adjustment mode or a value manually set previously (a so-called last memory). In this case, the brightness of the screen changes significantly between before and after the switching, making it hard to see the screen.

The present invention is intended to solve the aforementioned problem, and provides a display device improved to prevent the brightness of the screen from changing so significantly as to cause a user to feel discomfort. The present invention also provides an imaging apparatus using the display device.

More specifically, the present invention provides a display device including:

a display section configured to display information;

an automatic determination section configured to determine a set value for brightness of the display section in accordance with ambient brightness;

an operation section configured to accept an operation on the set value for the brightness of the display section;

a brightness adjustment section configured to adjust the brightness of the display section based on the set value determined by the automatic determination section or the set value accepted by the operation section, and a prohibition section configured to prohibit the brightness adjustment section from adjusting the brightness of the display section based on the set value determined by the automatic determination section.

During a period from a point when the prohibition section prohibits the brightness adjustment that is based on the set value determined by the automatic determination section until the operation section accepts a new operation on the set value, the brightness adjustment section adjusts the brightness of the display section based on a first set value that is the set value determined by the automatic determination section last before the point of prohibition, or a second set value obtained by correcting the first set value.

In another aspect, the present invention provides an imaging apparatus including:

an imaging section configured to pick up an image of a subject;

the display device according to claim 1 configured to display an image based on an output from the imaging section;

an imaging mode selector configured to make a selection between an auto mode for adjusting an imaging parameter of the imaging section automatically and a manual mode for adjusting the imaging parameter manually.

The automatic determination section is enabled only when the auto mode is selected by the imaging mode selector.

When the manual mode is selected by the imaging mode selector, the prohibition section of the display device prohibits the brightness adjustment that is based on the set value determined by the automatic determination section.

The present invention has a mechanism of keeping the last-determined brightness of the display section as long as possible during the period from the point when the automatic brightness adjustment in accordance with the ambient brightness is prohibited until the new operation on the set value is accepted. More specifically, the brightness of the display section is adjusted based on the first set value, which is the set value determined last before the automatic brightness adjustment is prohibited, or the second set value obtained by correcting the first set value. Thereby, it is possible to prevent the brightness of the screen from changing freely and significantly.

DETAILED DESCRIPTION OF THE INVENTION

Hereinafter, an embodiment in which the display device of the present invention is applied to a video camera will be described in detail using the drawings.

Embodiment 1

1. Configuration

Figure 1:
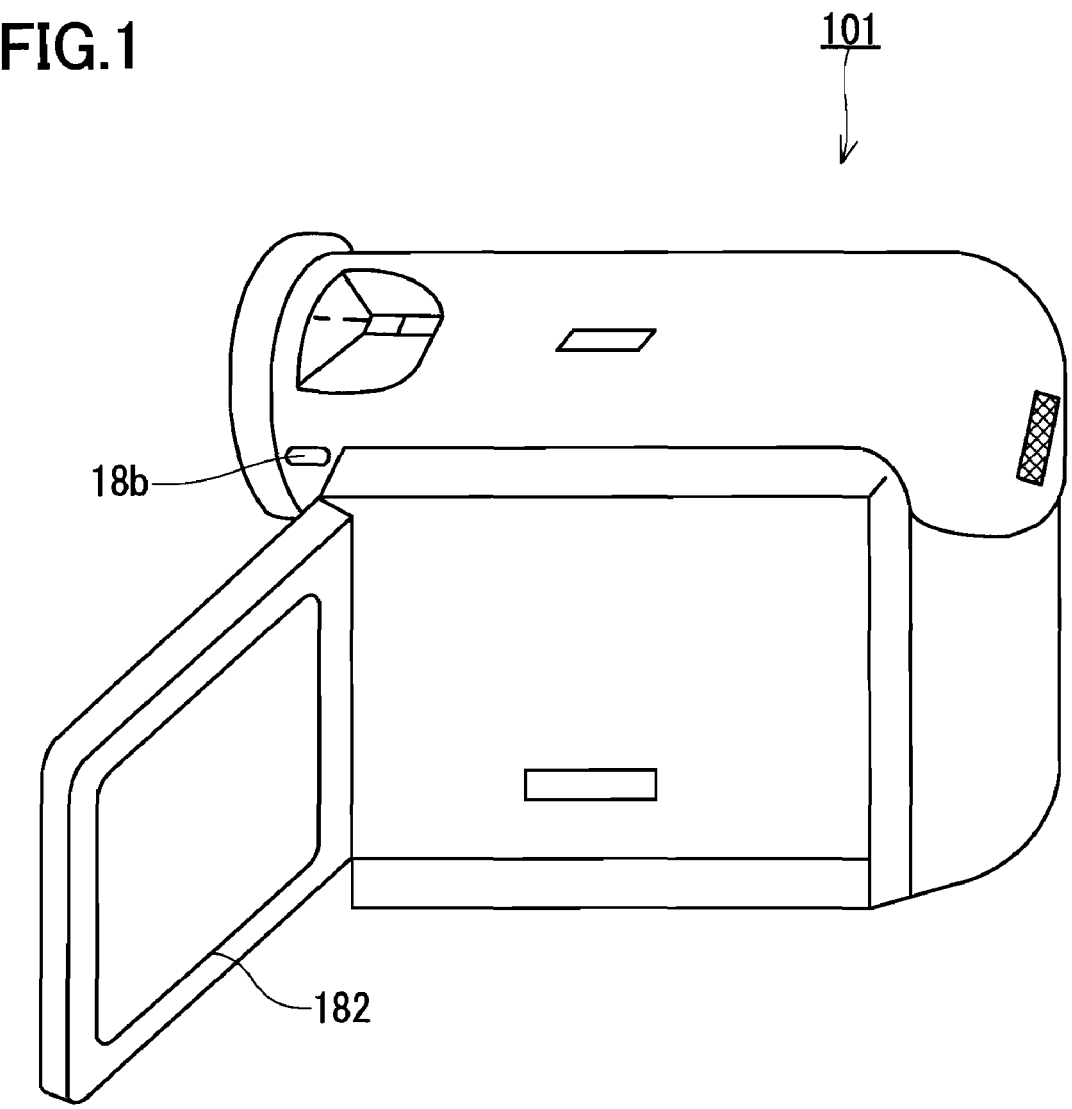
FIG. 1 is an outline view of a video camera using a display device according to an embodiment of the present invention.

FIG. 1 is an outline view of an imaging apparatus using the display device of the present invention. Examples of the imaging apparatus include a digital video camera and a digital still camera. In Embodiment 1, a digital video camera is described. A video camera 101 includes a liquid crystal monitor 182 as a display section. The liquid crystal monitor 182 is attached to the video camera 101 so as to be opened/closed freely. For reducing the power consumption, the liquid crystal monitor 182 displays no picked-up images, etc. when closed, and starts displaying them when opened.

(1-1. Configuration of the Video Camera)

Figure 2:
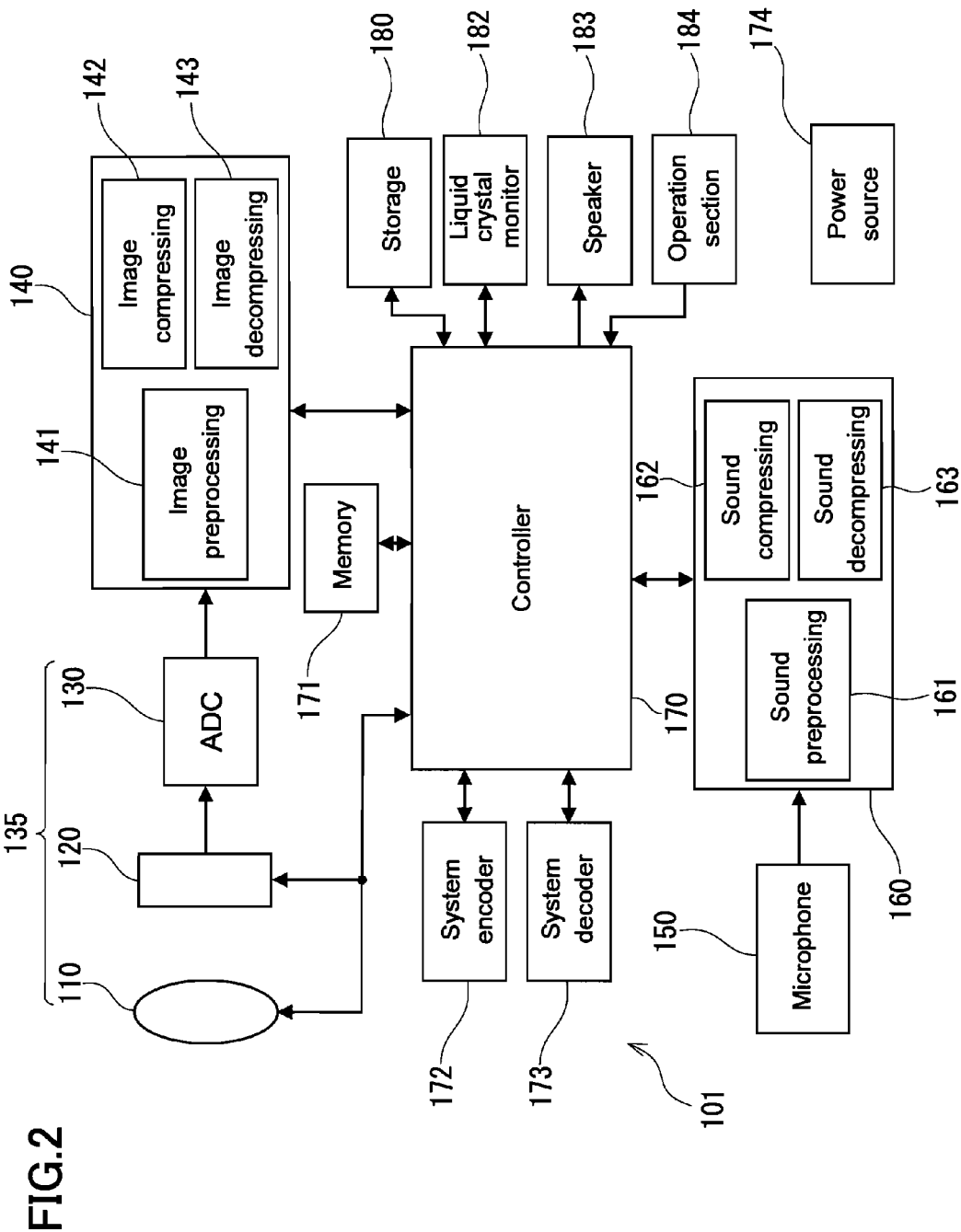
FIG. 2 is a block diagram showing a configuration of the video camera.

FIG. 2 is a block diagram showing a configuration of the video camera 101 according to Embodiment 1 of the present invention. The video camera 101 includes an optical system 110, an image pickup element 120, an ADC (analog-digital converter) 130, an image processing section 140, a controller 170, a memory 171, a microphone 150, a sound processing section 160, a system encoder 172, a system decoder 173, a storage 180, the liquid crystal monitor 182, a speaker 183, an operation section 184 and a power source 174. All of these elements are not necessarily essential for carrying out the present invention. FIG. 2 merely shows a typical configuration of the video camera 101. Hereinafter, the configuration of the video camera 101 will be described in detail.

The video camera 101 picks up an image of a subject formed by the optical system 110, using the image pickup element 120. The image processing section 140 executes various image processes on the image data generated by the image pickup element 120. The sound processing section 160 executes various sound processes on the sound data collected by the microphone 150. The image data processed by the image processing section 140 and the sound data processed by the sound processing section 160 are subject to a system encoding process by the system encoder 172, and stored in the storage 180. Among the AV data (audio visual data) stored in the storage 180, etc., the image data can be displayed on the liquid crystal monitor 182 and the sound data can be outputted from the speaker 183.

The optical system 110 includes an object lens, a zoom lens, an aperture, an OIS unit (an optical image stabilizer unit), a focus lens, etc. The optical system 110 forms the image of the subject by collecting light from the subject.

The image pickup element 120 generates image data by picking up the image of the subject formed by the optical system 110. Typically, the image pickup element 120 is composed of a CMOS image sensor (a complementary metal-oxide semiconductor image sensor) or a CCD image sensor (a charge-coupled device image sensor). The ADC 130 converts the image data generated by the image pickup element 120 from analog signals into digital signals. The optical system 110, the image pickup element 120, and the ADC 130 composes an imaging section 135 for picking up the image of the subject and generating image data thereof.

The image processing section 140 executes various processes on the image data converted by the ADC 130. The image processing section 140 generates image data to be inputted to the system encoder 172 and image data to be displayed on the liquid crystal monitor 182. Also, the image processing section 140 generates image data to be displayed on the liquid crystal monitor 182 and image data to be inputted again to the system encoder 172, by processing image data outputted from the system decoder 173. The image processing section 140 can be composed of a DSP (digital signal processor) or a microcomputer, for example.

More specifically, the image processing section 140 includes an image preprocessing section 141, an image compressing section 142, and an image decompressing section 143. The image preprocessing section 141 executes various image processes, such as gamma correction and white balance correction, on an output from the imaging section 135, that is, the image data converted into digital signals by the ADC 130, and generates processed image data (moving image data or still image data).

The image compressing section 142 compresses the image data using a technique, such as DCT (discrete cosine transform), Huffman coding, and inter-frame prediction. As the method for compressing the moving image data, there can be mentioned MPEG-2 (Moving Picture Experts Group Phase 2) and H.264/AVC (Advanced Video Cording), for example. As the method for compressing the still image data, JPEG (Joint Photographic Experts Group) and GIF (Graphics Interchange Format) can be mentioned, for example. However, the compressing method in the present invention is not limited to these.

When the compressed image data outputted from the system decoder 173 is reproduced on the liquid crystal monitor 182, for example, the image decompressing section 143 decodes this image data into an uncompressed state.

The microphone 150 collects sound and generates sound data. In order to handle the inputs of stereo sound and multichannel sound, the microphone 150 may be composed of a plurality of microphones.

The sound processing section 160 executes various processes on the sound data from the microphone 150. The sound processing section 160 generates sound data to be inputted to the system encoder 172 and sound data to be outputted to the speaker 183. Also, the sound processing section 160 generates the sound data to be outputted to the speaker 183 and sound data to be inputted again to the system encoder 172, by executing a sound process on sound data outputted from the system decoder 173. The sound processing section 160 can be composed of a DSP or a microcomputer, for example.

More specifically, the sound processing section 160 includes a sound preprocessing section 161, a sound compressing section 162 and a sound decompressing section 163. The sound preprocessing section 161 converts the analog sound data collected by the microphone 150 and generates digital signal sound data. In addition, the sound preprocessing section 161 executes various sound processes such as generations of stereo sound and multichannel sound.

The sound compressing section 162 compresses the sound data using a compression format in compliance with AC 3 (Audio Code number 3), AAC (Advanced Audio Coding), etc., for example. However, the compressed sound data in the present invention is not limited to sound data compressed in these formats.

When the speaker 183 outputs sounds based on the compressed sound data outputted from the system decoder 173, for example, the sound decompressing section 163 decodes this sound data into an uncompressed state.

The system encoder 172 generates AV data to be recorded on the storage 180 by multiplexing the compressed image data outputted from the image processing section 140 and the compressed sound data outputted from the sound processing section 160.

The system decoder 173 decodes the AV data recorded on the storage 180, and generates compressed image data and compressed sound data. The system decoder 173 outputs the generated compressed image data to the image decompressing section 143 and the compressed sound data to the sound decompressing section 163, respectively.

The controller 170 is a control means for controlling the entire video camera 101. A function to be provided by the controller 170 can be realized by, for example, combining a hardware, such as a DSP, with a software including a control program to be executed by the hardware.

No matter whether the power source 174 of the video camera 101 is on or off, the memory 171 stores data to be held, such as the control program to be executed by the controller 170. The memory 171 can be a nonvolatile memory such as an EEPROM (Electrically Erasable Programmable Read-Only Memory) and a ferroelectric memory.

The storage 180 is composed of a memory card using a nonvolatile memory such as a flash memory and a ferroelectric memory, a hard disk, an optical disc, or the like. Various data, such as AV data, sound data, and image data, can be stored in the storage 180.

The liquid crystal monitor 182 can display images based on the image data generated by the imaging section 135 and images based on the image data in the AV data read out from the storage 180. Furthermore, the liquid crystal monitor 182 can display various setting information, recording duration, etc. of the video camera 101.

The speaker 183 can output sounds based on the sound data collected by the microphone 150 and sounds based on the sound data in the AV data read out from the storage 180.

The operation section 184 is a component collectively referring to various operational instruments, and includes a button, a cross key, etc. The operation section 184 accepts an order from a user and transmits the order to the controller 170.

The power source 174 supplies each part of the video camera 101 with the power necessary for operation. In a portable video camera, the power source 174 is a battery. The power source 174 is not limited to a battery, and may be an AC source (an alternating-current source).

(1-2. Detailed Configuration of the Controller)

Figure 3:
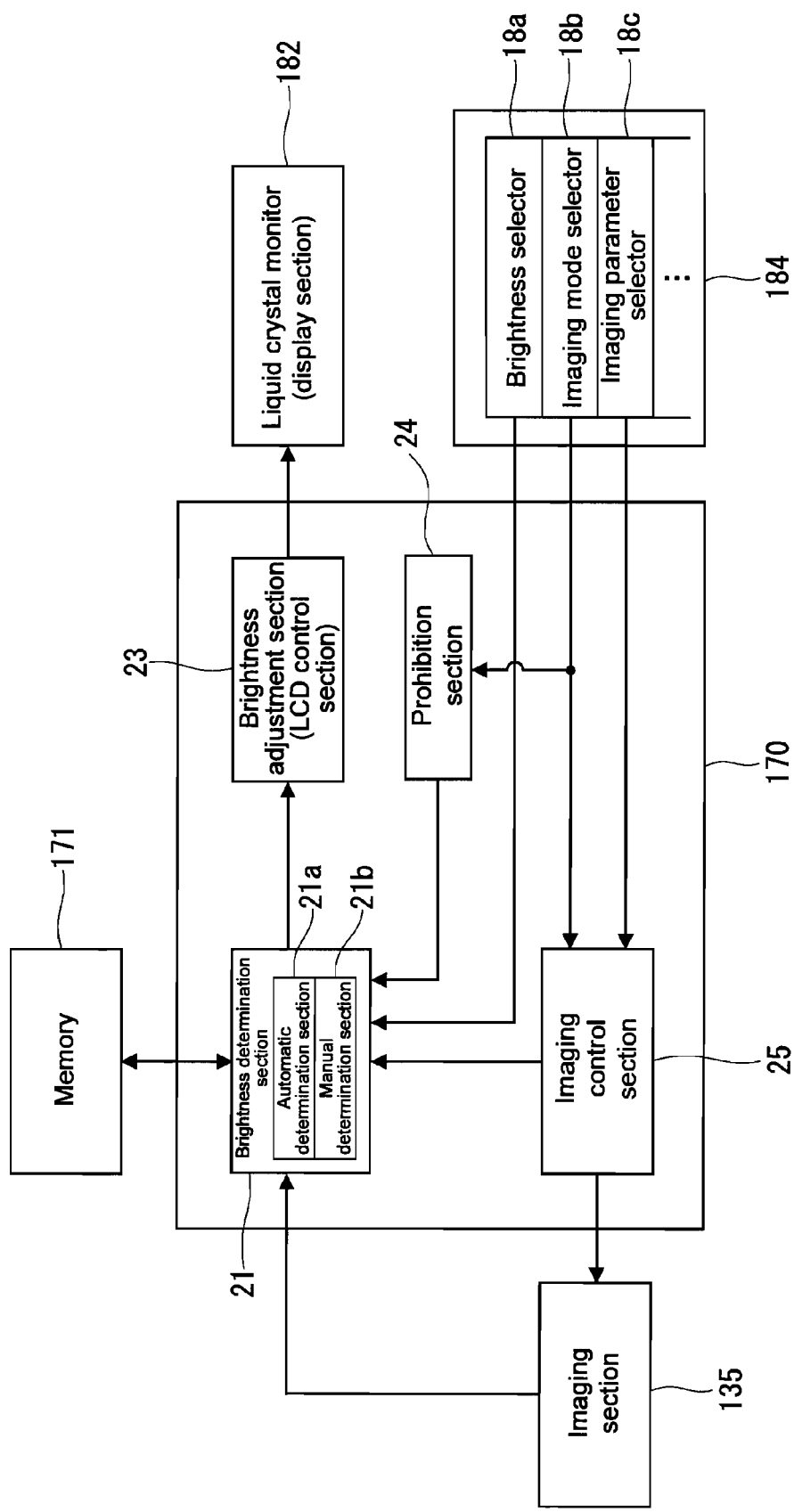
FIG. 3 is a detailed block diagram of a controller, showing main functions for adjusting brightness of a liquid crystal monitor.

FIG. 3 is a detailed block diagram of the controller, showing its main functions for adjusting brightness of the liquid crystal monitor. As shown in FIG. 3, the controller 170 includes a brightness determination section 21, a brightness adjustment section 23, a prohibition section 24, and an imaging control section 25 as elements for adjusting the brightness of the liquid crystal monitor 182. The operation section 184 includes a brightness selector 18a, an imaging mode selector 18b, and an imaging parameter selector 18c. As shown in FIG. 1, the imaging mode selector 18b is composed of a button provided on a housing of the video camera 101. The brightness selector 18a and the imaging parameter selector 18c are composed of, for example, a touch screen using the liquid crystal panel 182.

The video camera 101 has an auto mode and a manual mode as operation modes to be used when picking up an image. The auto mode is the operation mode for adjusting imaging parameters of the imaging section 135 automatically. The manual mode is the operation mode for adjusting the imaging parameters manually. Operating the imaging mode selector 18b switches the operation mode from the auto mode to the manual mode and vice versa.

Typically, the imaging parameters include at least one selected from the group consisting of an aperture, a gain, and a shutter speed. "The aperture and the gain" are parameters indicating the brightness of an image, and usually are adjusted by an aperture of a lens (F value) and a gain (dB) for amplifying a signal from the image pickup element 120. "The shutter speed" is a parameter indicating an exposure duration, and usually is adjusted by an electronic shutter. The electronic shutter usually is composed of a circuit embedded in an image sensor. By controlling the electronic shutter, it is possible to change the duration in which the image sensor converts light into effective electrical signals, that is, the shutter speed.

When the image is picked up in the auto mode, the imaging parameters are adjusted automatically by the imaging control section 25 in accordance with a predetermined algorithm. When the imaging mode selector 18b is operated to switch the operation mode from the auto mode to the manual mode, the imaging parameters are set to a default value of the manual mode, for example. When the image is picked up in the manual mode, desired imaging parameters can be set by the imaging parameter selector 18c.

When the auto mode is selected as the operation mode of the video camera 101, the brightness of the liquid crystal monitor 182 is adjusted automatically or manually. Specifically, it is possible to select whether to adjust the brightness of the liquid crystal monitor 182 automatically or manually by operating the brightness selector 18a. The brightness of the liquid crystal monitor 182 can be adjusted manually by operating the brightness selector 18a. In the case of adjusting the brightness of the liquid crystal monitor 182 manually, the brightness selector 18a accepts an operation on a set value for the brightness of the liquid crystal monitor 182. "The set value for the brightness" will be described in detail later.

In contrast, when the manual mode is selected as the operation mode of the video camera 101, the brightness of the liquid crystal monitor 182 needs to be adjusted manually. When the manual mode is selected, the image is picked up using the imaging parameters specified by a user. The user can adjust the imaging parameters while looking at the image displayed on the liquid crystal monitor 182. If the brightness of the liquid crystal monitor 182 is adjusted automatically at this time, an image deviating from the image actually being picked up (recorded) possibly is displayed on the liquid crystal monitor 182. That is, it is difficult to know accurately what the image being picked up is like. Thus, when the manual mode is selected, it is desirable that the automatic adjustment of the brightness be prohibited so that the brightness of the image being picked up, etc. are reflected appropriately on the liquid crystal monitor 182. In the auto mode, the image always is picked up under optimal conditions because of the function of the imaging control section 25. Thus, there is no problem even when an image more or less deviating from the image being picked up is displayed on the liquid crystal monitor 182.

As shown in FIG. 3, the brightness determination section 21 includes an automatic determination section 21a and a manual determination section 21b, and determines the set value for the brightness of the liquid crystal monitor 182. Specifically, the automatic determination section 21a determines the set value for the brightness of the liquid crystal monitor 182 in accordance with ambient brightness. The automatic determination section 21a is enabled only when the auto mode is selected by the imaging mode selector 18b. The manual determination section 21b gives the set value accepted by the brightness selector 18a to the brightness adjustment section 23.

The brightness adjustment section 23 adjusts the brightness of the liquid crystal monitor 182 based on the set value determined automatically by the automatic determination section 21a or the set value accepted by the brightness selector 18a of the operation section 18. Specifically, the brightness adjustment section 23 adjusts the brightness of the liquid crystal monitor 182 by applying an amount of current corresponding to the determined set value or the accepted set value to a back light. Such a function of the brightness adjustment section 23 may be provided by an LCD (Liquid Crystal Display) control section.

The prohibition section 24 serves to prohibit the automatic brightness adjustment of the liquid crystal monitor 182. Specifically, the prohibition section 24 prohibits the brightness adjustment that is based on the set value determined automatically by the automatic determination section 21a, responding to the satisfaction of a predetermined condition. In the present embodiment, it is judged that the predetermined condition is satisfied when the manual mode is selected by the imaging mode selector 18b.

The imaging control section 25 controls the imaging section 135 in accordance with the operation mode selected by the imaging mode selector 18b.

2. Operation (2-1. Operation of the Video Camera when Adjusting the Brightness of the Liquid Crystal Monitor)

Figure 4A:
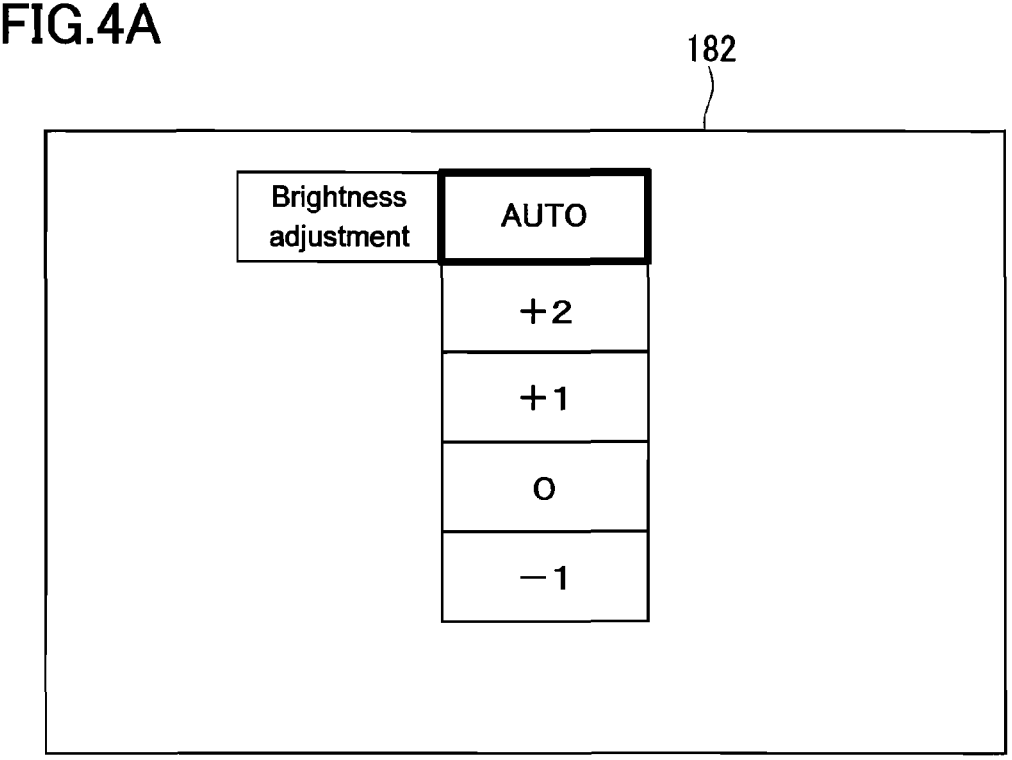
FIG. 4A is a view showing a screen for adjusting the brightness of the liquid crystal monitor when an operation mode is an auto mode.

FIG. 4A shows a screen displayed on the liquid crystal monitor 182 when the operation mode of the video camera 101 is the auto mode and a menu for adjusting the brightness is selected by operating a menu button (not shown). Likewise, FIG. 4B shows a screen displayed on the liquid crystal monitor 182 when a menu for adjusting the brightness in the manual mode is selected.

As shown in FIG. 4A, when the operation mode of the video camera 101 is the auto mode, it is possible to select one of the five icons, "AUTO", "+2", "+1", "0", and "−1." "AUTO" denotes an automatic adjustment mode for adjusting automatically the brightness of the liquid crystal monitor 182 in accordance with the ambient brightness. "+2", "+1", "0", and "−1" denote the set values prepared for a manual adjustment mode in which the user sets the brightness of his/her preference regardless of the ambient brightness. That is, in the auto mode, it is possible to select whether to enable the function of the automatic determination section 21a. The selected icon is highlighted so that the current set value can be known. In the example of FIG. 4A, "AUTO" is selected. As the method for highlighting, there can be mentioned a method in which the icon to be highlighted has a different color from that of the other icons, and a method in which a thick frame is displayed to surround the icon to be highlighted.

Figure 4B:
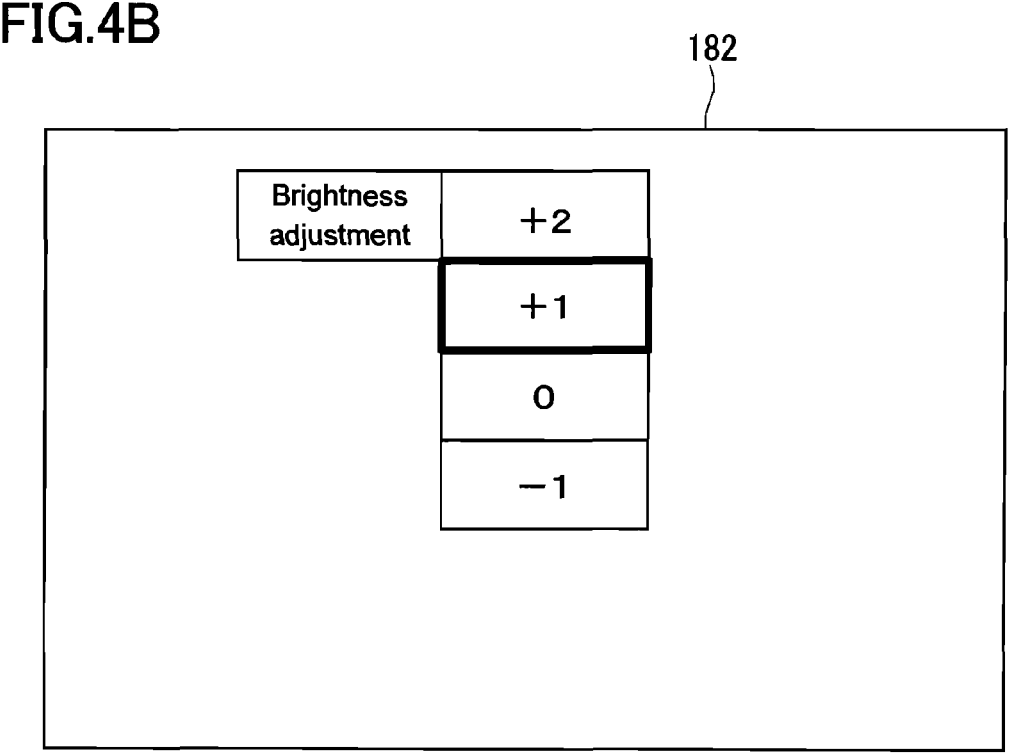
FIG. 4B is a view showing the screen for adjusting the brightness of the liquid crystal monitor when the operation mode is a manual mode.

As shown in FIG. 4B, when the operation mode of the video camera 101 is the manual mode, "AUTO" neither can be selected nor displayed on the screen. In the manual mode, it is possible to select one of the four icons "+2", "+1", "0", and "−1." "+1" is selected in the example of FIG. 4B. When "0" is selected, the liquid crystal monitor 182 has a standard brightness. The liquid crystal monitor 182 becomes brighter as the value increases to "+1" and further to "+2." When "−1" is selected, the liquid crystal monitor 182 is darker than the standard brightness.

When the video camera 101 is operated in the auto mode, the user can select the automatic adjustment mode or select among the set values prepared for the manual adjustment mode by operating the operation section 184 (the brightness selector 18a) on the menu screen for adjusting the brightness shown in FIG. 4A. When the video camera 101 is operated in the manual mode, the user can select among the set values prepared for the manual adjustment mode by operating the operation section 184 (the brightness selector 18a) on the menu screen for adjusting the brightness shown in FIG. 4B.

(2-2. Operation of the Video Camera in the Automatic Adjustment Mode)

The controller 170 (the brightness determination section 21) acquires the optimally-set imaging parameters (the aperture, gain and shutter speed) from the imaging section 135 and calculates the ambient brightness using the acquired imaging parameters. Since it can be considered that the ambient brightness around the liquid crystal monitor 182 is almost the same as the brightness acquired from the optical system 110, the brightness acquired from the optical system 110 can be used for calculating the ambient brightness. Subsequently, the set value for the brightness of the liquid crystal monitor 182 is determined based on the calculated brightness. Specifically, a look-up table indicating the correspondence relationship between the calculated brightness and the set value for the brightness of the liquid crystal monitor 182 is prepared in advance. By accessing the look-up table saved in the memory 171, it is possible to specify the set value corresponding to the calculated brightness.

When the mode used for adjusting the brightness of the liquid crystal monitor 182 is the automatic adjustment mode, the video camera 101 is operated in the auto mode. The controller 170 adjusts the imaging parameters automatically in the auto mode so as to optimize the imaging parameters. Specifically, the imaging control section 25 calculates the optimal aperture, gain, and shutter speed by analyzing the output from the imaging section 135, the image generated by the image processing section 140, etc. The imaging control section 25 controls the optical system 110 and the image pickup element 120 so that the image is picked up at the calculated optimal aperture, gain, and shutter speed. Thereby, the brightness determination section 21 can acquire the imaging parameters from the imaging control section 25 and calculate the ambient brightness using the acquired imaging parameters.

As described with reference to FIGS. 4A and 4B, when the brightness of the liquid crystal monitor 182 is intended to be adjusted manually, it is possible to select one of the set values including "+2", "+1", "0", and "−1." In contrast, in the automatic adjustment mode in which the automatic determination section 21a is enabled, one set value corresponding to the calculated brightness is determined from a plurality of the set values whose number exceeds the number of the set values that can be selected manually. The plurality of the set values to be determined in the automatic adjustment mode may have the same minimum and maximum values as those of the set values that can be selected manually. That is, the plurality of the set values with a narrow numerical width (in increments/decrements of 0.1 or 0.01) are written in the above-mentioned look-up table so that the brightness of the liquid crystal monitor 182 can be adjusted more minutely within the same range (from +2 to −1) as that for the manually-selectable set values. Thus, the automatic determination section 21a can determine a set value, such as +1.6, +0.35, and −0.82, as the set value for the brightness of the liquid crystal monitor 182.

As described above, the set values prepared for the automatic determination section 21a (i) have the same minimum and maximum values as those of the set values that can be selected using the brightness selector 18a, (ii) include the set values whose number exceeds the number of the set values that can be selected using the brightness selector 18a, and (iii) have a different numerical width from those of the set values that can be selected using the brightness selector 18a. If an excessive number of the set values are prepared for the manual brightness adjustment, the convenience possibly is deteriorated contrary to what is expected. In contrast, the convenience is not deteriorated when a large number of the set values are prepared for the automatic brightness adjustment. In fact, the visibility of the liquid crystal monitor 182 can be enhanced further by adjusting the brightness minutely.

The method for determining automatically the set value for the brightness is not limited to the method using the look-up table. For example, it is possible to adopt a method using a function representing the relationship between the ambient brightness and the set value for the brightness of the liquid crystal monitor 182.

(2-3. Operation of the Video Camera at Switching the Operation Mode from Auto Mode to Manual Mode)

Operation of the video camera when the operation mode is switched from the auto mode to the manual mode will be described using the flow chart shown in FIG. 5 and the view showing changes in the brightness adjustment at the time of switching the mode shown in FIG. 6.

When the imaging mode selector 18b is operated so as to switch the operation mode from the auto mode to the manual mode, the imaging control section switches the operation mode of the video camera 101 from the auto mode to the manual mode (S401). When the operation mode is switched from the auto mode to the manual mode, the prohibition section 24 prohibits the brightness adjustment that is based on the set value determined by the automatic determination section 21a. Here, the point when the prohibition section 24 prohibits the brightness adjustment that is based on the set value determined by the automatic determination section 21a is defined as a "point of prohibition."

Subsequently, the brightness determination section 21 judges whether the brightness adjustment before the switching of the operation mode was made in the automatic adjustment mode (S402). If the brightness adjustment was made in the automatic adjustment mode, the last-determined set value is put into "HOLD" as the set value for the brightness in order to keep the brightness of the liquid crystal monitor 182 (S403). Specifically, the last-determined set value is put into a register for storing the "HOLD" value. Here, "HOLD" means to keep the set value last determined by the automatic determination section 21a as it is. For example, when the last-determined set value is +1.6, +1.6 is stored as the "HOLD" value. The brightness determination section 21 sends the "HOLD" value (hereinafter also referred to as a first set value) to the brightness adjustment section 23. The brightness adjustment section 23 adjusts the brightness of the liquid crystal monitor 182 based on the first set value. Then, until the brightness selector 18a accepts a new operation for changing the set value, the brightness adjustment section 23 adjusts the brightness of the liquid crystal monitor 182 based on the first set value that is the set value determined by the automatic determination section 21a last before the point of prohibition.

Hereinafter, a state where the prohibition section 24 prohibits the brightness adjustment that is based on the set value determined by the automatic determination section 21a and the brightness adjustment section 23 is adjusting the brightness of the liquid crystal monitor 182 based on the first set value (or a second set value to be described later) is defined as a "specific state."

A detailed description will be made with regard to how the brightness adjustment is changed when the operation mode is switched from the auto mode to the manual mode, using FIG. 6. In FIG. 6, the set values selectable in the auto mode are shown at the upper part, and the set values selectable in the manual mode are shown at the lower part. The arrows relating the upper part and the lower part to each other indicate how the brightness adjustment is changed when the operation mode is switched from the auto mode to the manual mode and vice versa. When the operation mode is switched to the manual mode in a state where the operation mode is the auto mode and "AUTO", which denotes the automatic adjustment mode for the brightness adjustment, is selected, the set value determined last in the automatic adjustment mode is put into "HOLD" and the brightness is adjusted based on the "HOLD" value from this point of time onward. When the operation mode is switched to the manual mode in a state where the operation mode is the auto mode and the set value of "+2", "+1", "0", or "−1" is selected in the manual adjustment mode, the brightness determination section 21 keeps the set value of the manual adjustment mode as it is.

When the operation mode is switched to the auto mode in a state where the operation mode is the manual and the set value of "+2", "+1", "0", or "−1" is selected in the manual adjustment mode, the brightness determination section 21 keeps the set value of the manual adjustment mode as it is. In the case where the operation mode was switched from the auto mode to the manual mode before and then the operation mode is switched to the auto mode again in a state where the operation mode is the manual mode and the brightness is adjusted based on the "HOLD" value (the first set value), the information of the mode change is sent from the prohibition section 24 to the brightness determination section 21. The brightness determination section 21 selects "AUTO", which means the automatic adjustment mode, so as to adjust the brightness of the liquid crystal monitor 182 automatically in accordance with the ambient brightness. That is, when the predetermined condition is satisfied in the above-mentioned specific state, the function of the automatic determination section 21a is enabled, resuming the brightness adjustment of the liquid crystal monitor 182 based on the set value determined by the automatic determination section 21a. More specifically, when the imaging mode selector 18b is operated in the specific state so as to switch the operation mode from the manual mode to the auto mode, the brightness adjustment mode also is switched to the automatic adjustment mode.

When the automatic adjustment mode is selected in this way, the automatic determination section 21a resumes the calculation of the set value in accordance with the ambient brightness. At this time, the last-stored "HOLD" value possibly deviates from the new set value calculated by the automatic determination section 21a. Thus, when the automatic adjustment mode is selected, it is desirable to adjust the brightness of the liquid crystal monitor 182 so that the brightness of the liquid crystal monitor 182 is changed stepwise from the brightness corresponding to the "HOLD" value to the brightness corresponding to the new set value. Specifically, it is possible to employ a method in which the brightness is changed by the numerical width of the set values prepared for the automatic determination section 21a (in increments/decrements of 0.1, for example) at a predetermined rate (every other minute, for example). Thereby, an abrupt change in the brightness of the liquid crystal monitor 182 can be prevented.

As described above, when the operation mode is switched from the auto mode to the manual mode, it is possible to maintain the brightness of the liquid crystal monitor 182 by keeping the same set value before and after the mode change as the set value for the brightness of the liquid crystal monitor 182.

The change in the brightness of the liquid crystal monitor 182 can be prevented completely by using, as the "HOLD" value, the set value (the first set value) determined by the automatic determination section 21a last before the point of prohibition. However, it is not necessary to use the first set value as long as a significant change in the brightness can be avoided. More specifically, the brightness of the liquid crystal monitor 182 may be adjusted based on the second set value obtained by correcting the first set value. The method for correcting the first set value is not particularly limited. For example, it is possible to use a simple method of multiplying the first set value by a predetermined correction constant.

Figure 5:
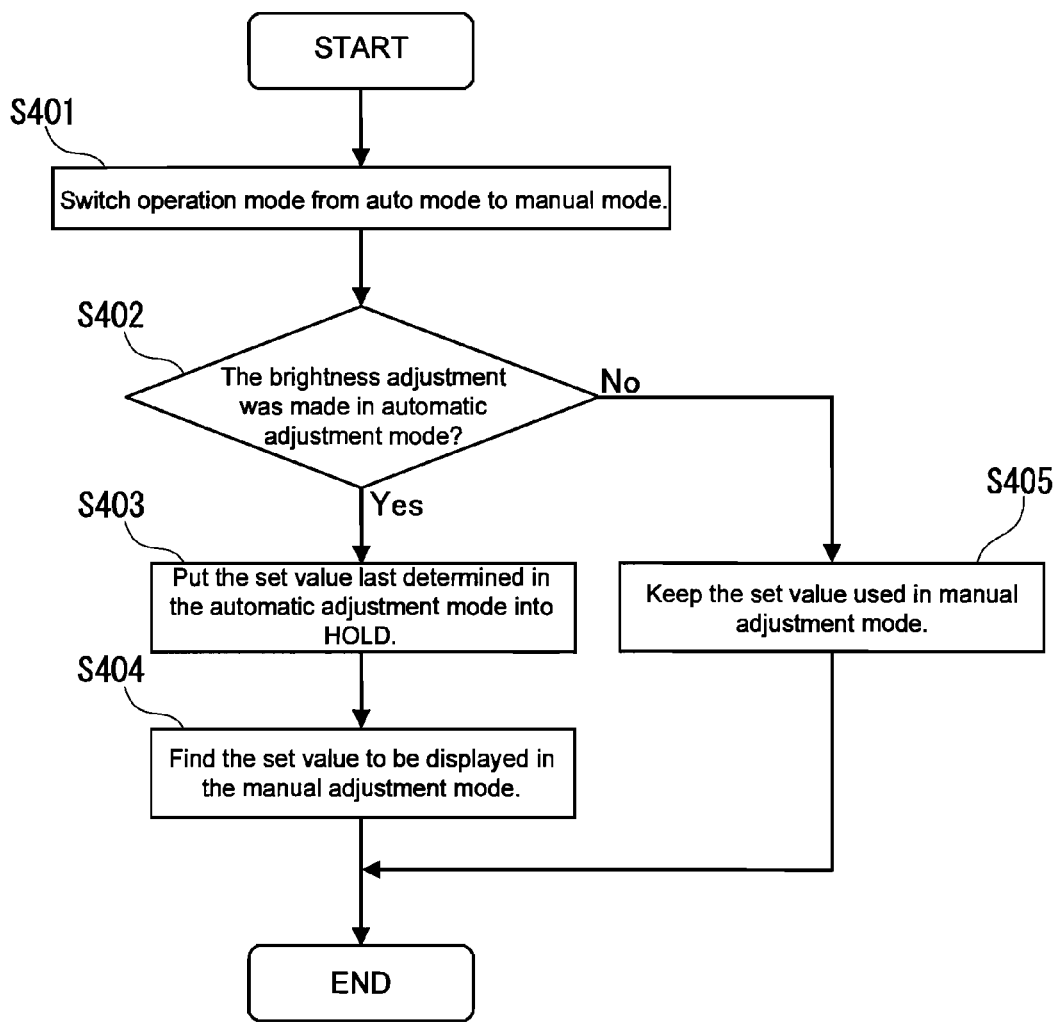
FIG. 5 is a flow chart showing a process to be executed when the operation mode is switched from the auto mode to the manual mode.
Figure 6:
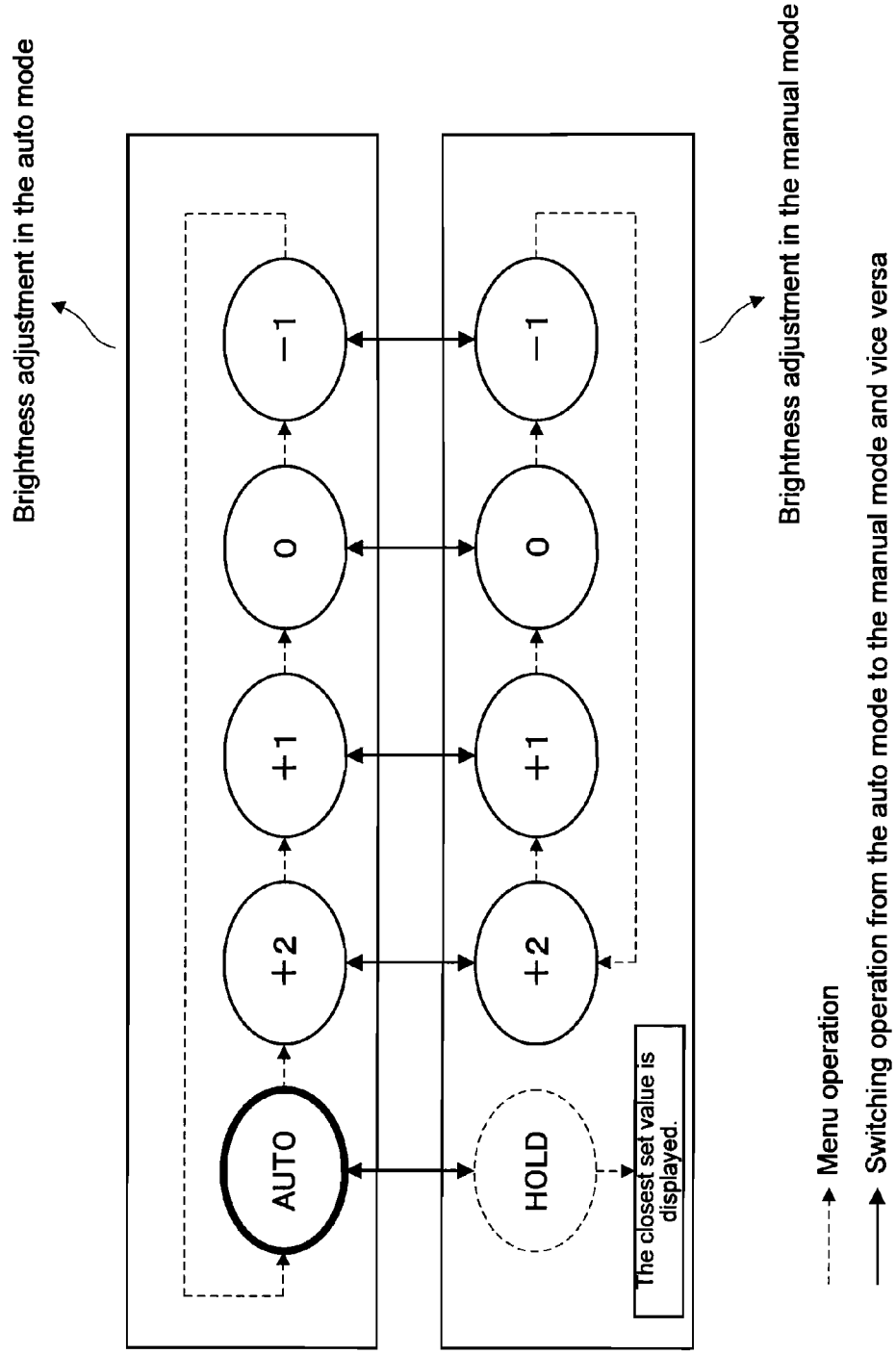
FIG. 6 is a view describing changes in the brightness adjustment when the operation mode is switched from the auto mode to the manual mode.

The description continues by going back to the flow chart of FIG. 5. As shown in Step S404 of the flow chart of FIG. 5, when a menu operation for checking the current set value is performed in the specific state, the set value to be displayed on the liquid crystal monitor 182 is found. Although the brightness adjustment mode in the specific state is the manual adjustment mode, the brightness of the liquid crystal monitor 182 is adjusted based on the "HOLD" value (the first set value or the second set value). When the "HOLD" value is +1.6, for example, it is highly unlikely that an icon for displaying this value is prepared. Moreover, the "HOLD" value occasionally is not present in the set values selectable in the manual adjustment mode. In such a case, displaying the set value closest to the "HOLD" value as a temporary set value makes it unnecessary to prepare an additional icon beforehand and makes it possible to avoid a situation where the set value cannot be checked.

More specifically, in the specific state, the manual determination section 21b determines the set value to be displayed for accepting the new manual operation, based on the first set value or the second set value that is the "HOLD" value. Specifically, the manual determination section 21b converts the "HOLD" value into a set value for the manual adjustment mode. For example, when the "HOLD" value is +1.6, it is converted into "+2" as the set value for the manual adjustment mode. When the menu operation for checking the set value is performed, the icon of "+2" after the conversion is highlighted. Thereby, the user can understand the brightness of the liquid crystal monitor 182 after the mode change approximately is equivalent to which of the set values prepared for the manual adjustment mode, and can use it as a reference when changing the set value in the manual adjustment mode thereafter. As the method for converting the "HOLD" value into the set value for the manual adjustment mode, there can be mentioned a method of rounding off the "HOLD" value to the nearest whole number. The converting method is not limited to this, and it may be a method using a predetermined function.

More specifically, in the specific state, the manual determination section 21b finds, as a temporary set value, the set value closest to the first set value or the second set value that is the "HOLD" value, among the set values that can be selected using the brightness selector 18a. An icon indicating the temporary set value is displayed on the liquid crystal monitor 182 as information depicting the current set value for the brightness of the liquid crystal monitor 182, together with icons indicating the other one or more set values that can be selected using the brightness selector 18a, in such a manner that the icon indicating the temporary set value is distinguishable from the other icons. When the icon indicating the temporary set value is selected by an input using the brightness selector 18a, the brightness adjustment section 23 readjusts the brightness of the liquid crystal monitor 182 so that the liquid crystal monitor 182 obtains brightness corresponding to the true set value indicated by the selected icon. In the above-mentioned example, when the highlighted icon of "+2" is selected, the brightness adjustment section 23 cancels "+1.6" that is the "HOLD" value, and readjusts the brightness of the liquid crystal monitor 182 so that the liquid crystal monitor 182 obtains brightness corresponding to the selected set value of "+2". By executing such a process, it is possible to make a smooth switch to the intrinsic manual adjustment mode without causing the user to feel significant discomfort.

In contrast, as shown in the flow chart of FIG. 5, when the brightness adjustment before the operation mode change was made in the manual adjustment mode, the set value that had been used in the manual adjustment mode is kept (S405). By keeping the same set value between before and after the mode change, it is possible to maintain the brightness of the liquid crystal monitor 182.

In Step S403, it also is possible to find, as the second set value, the set value closest to the first set value among the set values that can be selected using the brightness selector 18a and save the found second set value as the "HOLD" value. For example, when the first set value is +1.6, +2.0 can be found as the second set value. In this case, the second set value itself is the set value to be displayed on the liquid crystal monitor 182 in the manual adjustment mode, and thus the actual brightness of the liquid crystal monitor 182 conforms to the set value highlighted on the menu screen.

In the video camera 101 of the present embodiment 1, the operation mode can be switched from the auto mode to the manual mode by the imaging mode selector 18b even during the time when the imaging section 135 is picking up the image of the subject and the moving image data generated by the image processing section 140 is being stored into the storage 180 consecutively. The imaging mode selector 18b is provided on the housing of the video camera 101 to be operated easily also during the image pickup. Since it is considered that the operation mode is switched frequently during the image pickup, the process of the flow chart shown in FIG. 5 are effective in many cases.

Embodiment 2

In Embodiment 2, in which the display device of the present invention is applied to a video camera, the configuration is the same as that of Embodiment 1. Thus, the description thereof will be omitted.

Embodiment 2 describes the operation of the video camera 101 when a user turns off the power source 174 in the auto mode, and then turns on the power source 174 in the manual mode. Assume that the user turns off the power source 174 using the operation section 184 (such as an electric power switch) when the operation mode of the video camera 101 is the auto mode and the brightness adjustment is made in the automatic adjustment mode. In this case, the controller 170 (the automatic determination section 21a) saves, in the memory 171, the set value for the brightness of the liquid crystal monitor 182 calculated based on the ambient brightness acquired from the optical system 110. More specifically, the controller 170 saves, in the memory 171, the last set value determined by the automatic determination section 21a before a point when an operation for turning off the power source 174 is performed, when the power source 174 is turned off in a state where the brightness adjustment section 23 is adjusting the brightness of the liquid crystal monitor 182 based on the set value determined by the automatic determination section 21a.

Next, assume that the operation mode of the video camera 101 is switched from the auto mode to the manual mode in a state where the power source 174 is off and then the power source 174 is turned on using the operation section 184. In this case, the controller 170 checks the presence of the set value in the memory 171. When the set value is present, the controller 170 adjusts the brightness of the liquid crystal monitor 182 based on this set value.

Immediately after the power source 174 is turned on, the brightness determination section 21 of the controller 170 acquires the "HOLD" value for the manual mode as the set value for the brightness. Also, the brightness determination section 21 of the controller 170 converts the "HOLD" value into the set value of the manual adjustment mode. For example, in the case where the last set value determined before a point when an operation for turning off the power source 174 is performed in the auto mode is +0.7, and the power source 174 is turned on in the manual mode, the brightness determination section 21 adjusts the brightness of the liquid crystal monitor 182 at +0.7. Furthermore, the brightness determination section 21 finds "+1" as the temporary set value for the manual adjustment mode at the time of turning on the power source 174. When the menu operation for checking the set value is performed, the icon of "+1" is highlighted. The method for finding the temporary set value for the manual adjustment mode from the "HOLD" value is the same as in Embodiment 1.

In this way, the last-determined set value is saved in the case where the power source 174 is turned off when the brightness adjustment is being adjusted automatically. When the power source 174 is turned on thereafter in the manual mode, the brightness of the liquid crystal monitor 182 is adjusted using the saved set value. Thereby, it is possible to prevent the brightness of the liquid crystal monitor 182 from changing significantly between before and after the on/off of the power source 174.

The video camera 101 may be configured so that the operation mode thereof cannot be changed when the power source 174 is off. In this case, the following process can be executed. First, the first set value or the second set value is saved in the memory 171 when the power source 174 is turned off in the specific state where the prohibition section 24 prohibits the brightness adjustment that is based on the set value determined by the automatic determination section 21a and the brightness adjustment section 23 is adjusting the brightness of the liquid crystal monitor 182 based on the first set value or the second set value that is the "HOLD" value. When the power source 174 is turned off in the specific state and turned on next, the brightness adjustment section 23 adjusts the brightness of the liquid crystal monitor 182 based on the first set value or the second set value saved in the memory 171. Thereby, it is possible to prevent the brightness of the liquid crystal monitor 182 from changing significantly between before and after the on/off of the power source 174.

In addition, the above-mentioned technique can be used advantageously in the case where the video camera 101 has an auto power save function. More specifically, when the auto power save function serves to suspend the displaying of the image on the liquid crystal monitor 182, the last set value determined before the suspension is saved in the memory 171 as the first or the second set value. When the operation using the operation section 184 is performed thereafter to resume displaying the image on the liquid crystal monitor 182, the brightness of the liquid crystal monitor 182 is adjusted based on the first set value or the second set value saved in the memory 171. Use of the auto power save function possibly causes frequent switchings between display and non-display of the image on the liquid crystal monitor 182. However, it is possible to keep the brightness of the liquid crystal monitor 182 as constant as possible by executing the process according to the present embodiment. The auto power save function is a function for suspending the displaying of the image on the liquid crystal monitor 182 in order to prevent the battery consumption when neither recordings nor operations have been performed for a certain period of time. When any operation is performed during the suspension, the displaying of the image on the liquid crystal monitor 182 is resumed.

As described above, the brightness determination section 21 (the manual determination section 21b) can determine the set value to be displayed for accepting a new manual operation, based on the first or second set value saved in the memory 171.

Other Embodiments

So far, Embodiment 1 and Embodiment 2 have been described as embodiments of the invention. However, the present invention is not limited to these. Other embodiments of the present invention are summarized in this section.

Embodiment 1 and Embodiment 2 describe configurations using the liquid crystal monitor 182 as the display section of the display device. However, the present invention is not limited to these. An organic EL display (an organic light emitting display), a plasma display, etc. can be used as the display section of the display device. In short, the display section should be a section displaying information and having the function of adjusting the brightness of the screen.

In the display device of the present invention, it is possible to eliminate a significant change in the brightness of the screen also when the operation mode is switched from the auto mode for adjusting a setting automatically to the manual mode for operating in accordance with a user setting. Such a display device can be applied to imaging apparatuses, such as a digital video camera and a digital still camera.

The present invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A display device comprising:
  a display section configured to display information;
  an automatic determination section configured to determine a set value for brightness of the display section in accordance with ambient brightness;
  an operation section configured to accept an operation on an other set value for the brightness of the display section;
  a brightness adjustment section configured to adjust the brightness of the display section based on the set value determined by the automatic determination section or the other set value accepted by the operation section, and
  a prohibition section configured to prohibit the brightness adjustment section from adjusting the brightness of the display section based on the set value determined by the automatic determination section,
  wherein during a period from a point when the prohibition section prohibits the brightness adjustment that is based on the set value determined by the automatic determination section until the operation section accepts a new manual operation for adjusting the brightness of the display section, the brightness adjustment section adjusts the brightness of the display section based on a first set value that is the set value determined by the automatic determination section last before the point of prohibition, or a second set value obtained by correcting the first set value.

2. The display device according to claim 1, further comprising a manual determination section configured to determine, in a specific state, a temporary set value to be displayed for accepting the new manual operation, based on the first set value or the second set value, when the specific state is defined as a state where the prohibition section prohibits the brightness adjustment that is based on the set value determined by the automatic determination section and the brightness adjustment section is adjusting the brightness of the display section based on the first set value or the second set value.

3. The display device according to claim 2, wherein:

in accordance with the ambient brightness, the automatic determination section determines one set value among a plurality of set values that have the same minimum and maximum values as those of the set values that can be selected using the operation section, include the set values whose number exceeds the number of the set values that can be selected using the operation section, and have a different numerical width from those of the set values that can be selected using the operation section;

in the specific state, the manual determination section finds, as the temporary set value, the set value closest to the first set value or the second set value among the set values that can be selected using the operation section;

an icon indicating the temporary set value is displayed on the display section as information depicting a current set value for the brightness of the display section, together with icons indicating the other one or more set values that can be selected using the operation section, in such a manner that the icon indicating the temporary set value is distinguishable from the other icons, and when the icon indicating the temporary set value is selected by an input using the operation section, the brightness adjustment section readjusts the brightness of the display section so that the display section obtains brightness corresponding to a true set value indicated by the selected icon.

4. The display device according to claim 1, further comprising:

a power source, and a memory configured to save a last set value determined by the automatic determination section before a point when an operation for turning off the power source is performed, when the power source is turned off in a state where the brightness adjustment section is adjusting the brightness of the display section based on the set value determined by the automatic determination section.

5. The display device according to claim 1, further comprising:

a power source, and a memory configured to save the first set value or the second set value when the power source is turned off in a specific state where the prohibition section prohibits the brightness adjustment that is based on the set value determined by the automatic determination section and the brightness adjustment section is adjusting the brightness of the display section based on the first set value or the second set value, wherein in the case where the power source is turned off in the specific state and turned on next, the brightness adjustment section adjusts the brightness of the display section based on the first set value or the second set value saved in the memory.

6. The display device according to claim 5, further comprising a manual determination section configured to determine, based on the first set value or the second set value saved in the memory, the set value to be displayed for accepting the new manual operation.

7. An imaging apparatus, comprising:

an imaging section configured to pick up an image of a subject;

the display device according to claim 1 configured to display the image based on an output from the imaging section;

an imaging mode selector configured to make a selection between an auto mode for adjusting an imaging parameter of the imaging section automatically and a manual mode for adjusting the imaging parameter manually, wherein:

the automatic determination section is enabled only when the auto mode is selected by the imaging mode selector, and when the manual mode is selected by the imaging mode selector, the prohibition section of the display device prohibits the brightness adjustment that is based on the set value determined by the automatic determination section.

8. The imaging apparatus according to claim 7, wherein the imaging parameter includes at least one selected from the group consisting of an aperture, a gain, and a shutter speed.

9. The imaging apparatus according to claim 7, further comprising:

an image processing section configured to generate moving image data by processing the output from the imaging section, and a storage configured to record the moving image data, wherein an operation mode can be switched from the auto mode to the manual mode by the imaging mode selector during the time when the imaging section is picking up the image of the subject and the moving image data generated by the image processing section is being stored into the storage consecutively.

* * * * *